United States Patent [19]

Takahashi

[11] Patent Number: 4,866,513
[45] Date of Patent: Sep. 12, 1989

[54] COLOR CONTRAST CORRECTION SYSTEM FOR VIDEO IMAGES OBTAINED FROM COLOR FILM

[75] Inventor: Isao Takahashi, Tokyo, Japan

[73] Assignee: Fuji Photo Film Co., Ltd., Japan

[21] Appl. No.: 227,467

[22] Filed: Aug. 2, 1988

Related U.S. Application Data

[63] Continuation of Ser. No. 113,379, Oct. 26, 1987, abandoned, which is a continuation of Ser. No. 879,885, Jun. 30, 1986, abandoned.

[30] Foreign Application Priority Data

Jul. 4, 1985 [JP]  Japan ................... 60-145776

[51] Int. Cl.⁴ .............. G03F 3/08; H04N 1/46; H04N 5/202; H04N 9/69
[52] U.S. Cl. ..................... 358/76; 358/32; 358/54; 358/80; 358/164
[58] Field of Search ............ 358/29 C, 32, 54, 164, 358/80, 76

[56] References Cited

U.S. PATENT DOCUMENTS

| | | | |
|---|---|---|---|
| 2,255,691 | 9/1941 | Wilson | 358/164 |
| 3,684,825 | 8/1972 | Dischert et al. | 358/32 |
| 3,740,457 | 6/1973 | Meeussen et al. | 358/32 |
| 4,097,892 | 6/1978 | Balding | 358/76 |
| 4,227,216 | 10/1980 | Blom | 358/164 |
| 4,364,084 | 12/1982 | Akimoto et al. | 358/54 |
| 4,410,909 | 10/1983 | Ueda et al. | 358/80 |
| 4,467,364 | 8/1984 | Konagaya | 358/76 |
| 4,472,736 | 9/1984 | Ushio et al. | 358/80 |
| 4,503,464 | 3/1985 | Dielhof | 358/164 |
| 4,608,595 | 8/1986 | Nakayama et al. | 358/29 C |
| 4,636,845 | 1/1987 | Alkofer | 358/80 |
| 4,667,228 | 5/1987 | Kawamura et al. | 358/32 |
| 4,727,434 | 2/1988 | Kawamura | 358/80 |
| 4,805,013 | 2/1989 | Dei et al. | 358/80 |

FOREIGN PATENT DOCUMENTS

| | | | |
|---|---|---|---|
| 1251370 | 10/1967 | Fed. Rep. of Germany | 358/164 |
| 2622955 | 12/1976 | Fed. Rep. of Germany | 358/164 |
| 3435538 | 4/1986 | Fed. Rep. of Germany | 358/80 |
| 2312150 | 12/1976 | France | 358/164 |
| 55-39418 | 3/1980 | Japan | 358/29 C |
| 58-186291 | 10/1983 | Japan | 358/32 |
| 60-165886 | 8/1985 | Japan | 358/32 |
| 60-242776 | 12/1985 | Japan | 358/164 |

OTHER PUBLICATIONS

C. B. B. Wood et al., "Color Negative in the Telecine", *Journal of the SMPTE*, vol. 81, No. 9, Sep. 1972, pp. 661-664.

Primary Examiner—James J. Groody
Assistant Examiner—Randall S. Svihla
Attorney, Agent, or Firm—Abelman, Frayne, Rezac & Schwab

[57] ABSTRACT

A color contrast correction system for video images obtained from color film provides signals representative of the extent of exposure of the color film and then provides for adjustment of the gamma of the respective RGB signals to correct for over or under exposure of the film.

3 Claims, 3 Drawing Sheets

COLOR CONTRAST CORRECTION SYSTEM FOR VIDEO IMAGES OBTAINED FROM COLOR FILM

This appliction is a continuation of application Ser. No. 07/113,379, filed on Oct. 26, 1987, now abandoned, which is a continuation of application Ser. No. 06/879,885, filed on June 30, 1986, now abandoned.

FIELD OF THE INVENTION

This invention relates to a system for obtaining color signals of normal contrast from color film, even if the color film is insufficiently exposed or the color film is excessively exposed.

BACKGROUND OF THE INVENTION

It is known that video signals can be obtained from images on color film and can be reproduced on a television receiver or a monitor television screen.

FIG. 3 is a block diagram of a prior art system used for the above purpose. Referring to FIG. 3, numeral 1 indicates a roll of negative color film, numeral 2 indicates a light source, numeral 3 indicates a color image pickup unit using vacuum tube or solid state image pickup devices, numerals 4 through 6 indicate R, G, and B color signals obtained from the color image pick up unit 3, numeral 7 indicates an inverting circuit, numerals 8 through 10 indicate gamma-corrected and inverted R, G, and B color signals, numeral 11 indicates an optional magnetic recording unit, numerals 12 through 14 indicate reproduced R, G, and B color signals from the recording unit 11, numeral 15 indicates a composite color video signal in NTSC system, and numeral 16 indicates an image display unit.

The inverting circuit 7 inverts and amplifies the respective R, G, and B signals in order to provide a signal representative of a printed positive image obtained from the negative color film 1. The inverting circuit 7 also has the function of gamma correction for the R, G, B signals to provide a normal contrast ratio in the reproduced image.

Heretofore, the gamma value Yp of the inverting circuit 7 has been constant, and since (1) Gamma value Yn of a normally exposed color film negative is approximately 0.65, and
(2) Gamma value Yr of an image pickup tube is approximately 1, and
(3) Gamma value Ys of a cathode-ray tube is approximately 2.2, the Yp is set at $$Yp = \frac{1}{Yn \times Yr \times Ys} = \text{approx. } 0.7$$

so that the overall gamma value is 1.

However, as can be seen from the characteristic curve of a color negative film shown in FIG. 4, gamma value of color negative film is not constant but varies with the extent of exposure of the film. Referring to FIG. 4, the vertical axis is scaled for color negative film density (D) and the horizontal axis is scaled for the logarithm of exposure (log E). Yn is approximately 0.65 for normally exposed film lying within exposure area 17, approximately 0.4 for film lying within area 18, and is approximately 0.3 for under exposed film lying within area 19. Therefore, the system shown in FIG. 3 in which the gamma value of the inverting circuit 7 is fixed at Yp=approximately 0.7, is not effective in that the reproduced image is too soft and of low contrast if the color negative film has been under or over exposed.

SUMMARY OF THE INVENTION

It is a primary object of the present invention to provide a system for correcting gradation, and which will produce color signals of normal contrast regardless of the extent of exposure of the color film.

In accordance with the present invention, each of the three color signals of R, G, and B outputted from the color image pickup means is analysed to obtain an average value, a maximum value, and a minimum value of the color signal within a single frame, and a gamma value for the color signal is corrected according to the detected characteristics values, thereby correcting the contrast graduation.

The system includes color image pickup means for obtaining separate R, G and B color signals, a gamma correction circuit for effecting a gamma value correction of each of the respective R, G, and B signals, a characteristics value detection circuit for separately detecting an average value, a maximum value, and a minimum value representative of exposure values within a single frame prior to gamma correction of said R, G, and B signals, and a gamma value changing circuit for automatically changing the gamma value of the gamma correction circuit in predetermined relation to the exposure value provided by the characerics value detection circuit.

The gamma correction circuit optionally provides manually selectable signals representative of a plurality of preset gamma values for gamma correction of the respective R, G, and B signals.

DESCRIPTION OF THE PREFERRED EMBODIMENT

Figure 1:
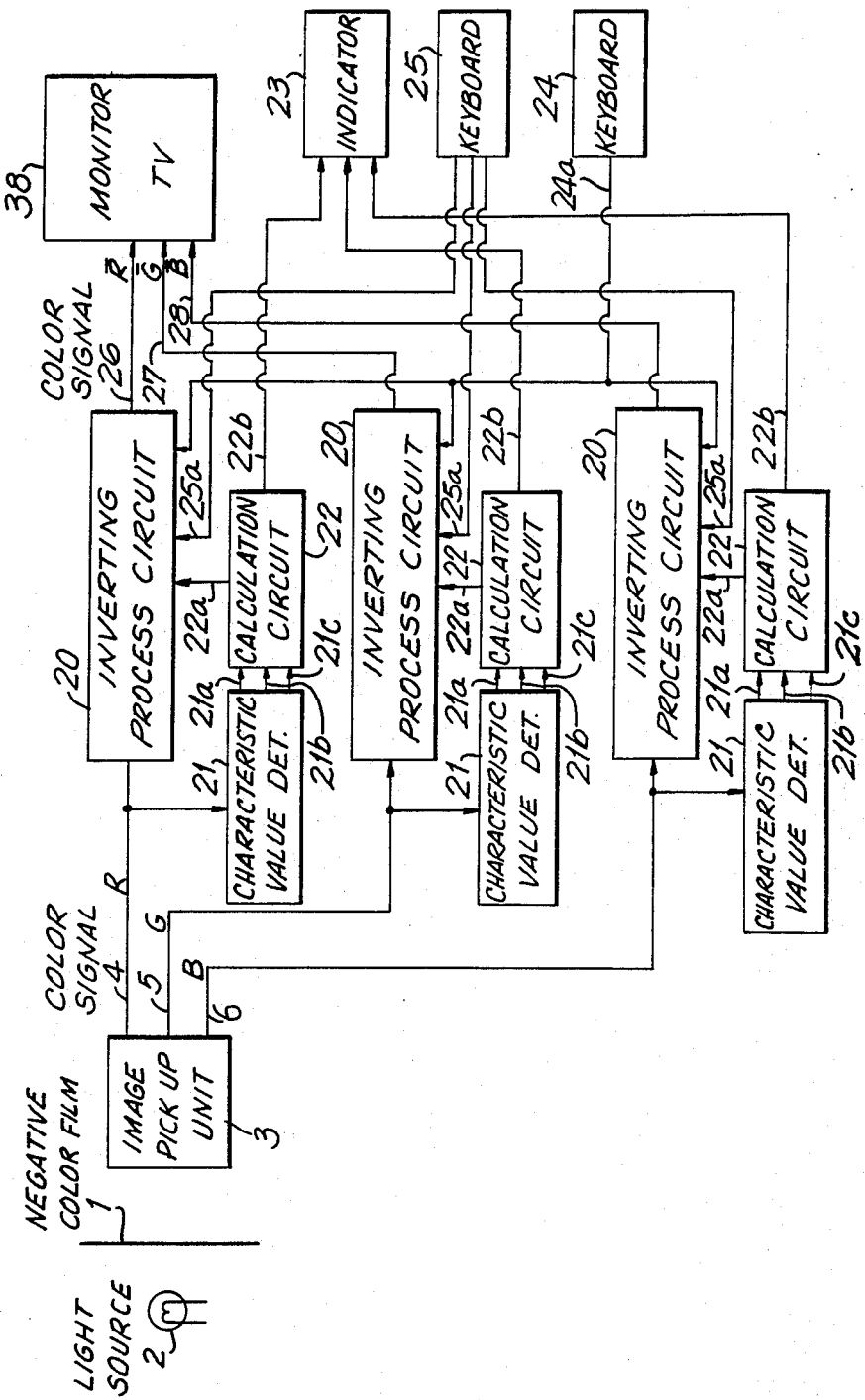
FIG. 1 is a block diagram showing schematically an embodiment according to the present invention.

In the drawings, 1 indicates a color negative film, 2 indicates a light source, 3 indicates a color image pickup unit, 4 through 6 indicates R, G, and B color signals, 20 indicates an inverting circuit, 21 indicates a characteristics value detection circuit, 22 indicates a calculation circuit, 22a indicates a gamma value change signal, 23 indicates an indicator, 24 indicates a keyboard, 24a indicates a gamma value preset signal, 25 indicates a keyboard, 25a indicates a gamma value change signal, and 26 through 28 indicate inverted and gamma-corrected R, G, and B color signals.

Figure 4:
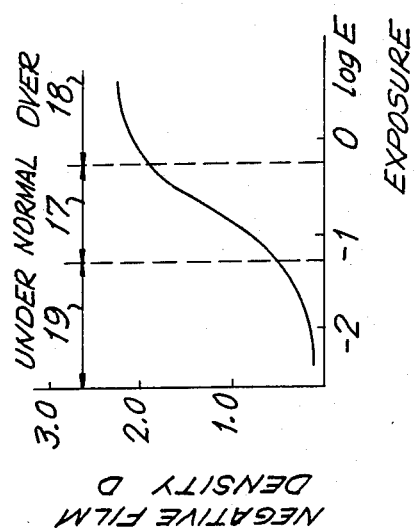
FIG. 4 shows characteristic curve of a color negative film.

FIG. 4 shows a characteristics curve of a color negative film. Exposure degree log E can be determined if the density D of the film is known, and hence gamma value Yn of the negative film can be determined. Since the average value of each color signal RGB obtained by the color image pickup means corresponds closely to the density of the negative film for that color, gamma value Yn can be approximately estimated from the average value of the color signals.

Insufficient or excessive exposure can be compensated by gamma correcting the color signals R, G, and B using a gamma value Yp corresponding to the average value of the color signal. However, the contrast of color negative films can vary even if the average value is the same. Differences between maximum value and minimum value of each color signal corresponds to the contrast for that color in the color negative film. Therefore, gradation can be more exactly corrected by determining the gamma correction value Yp by using the maximum and minimum values of the color signal in addition to the average value.

In FIG. 1, inverting circuit 20, an exposure value detection circuit 21 and a calculation circuit 22 are provided for each of the color signals of R, G, and B.

Figure 2:
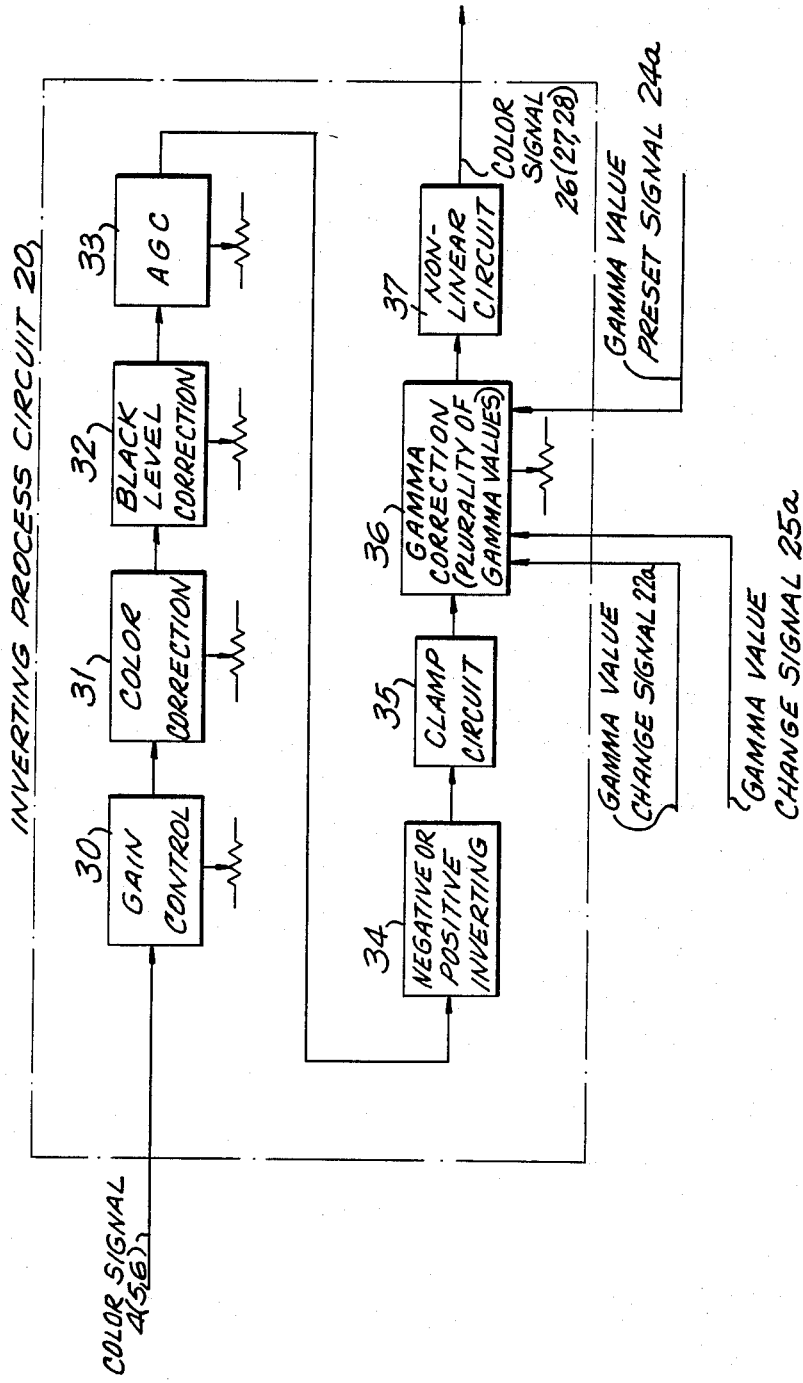
FIG. 2 is a block diagram of the inverting circuit shown in FIG. 1.
Figure 3:
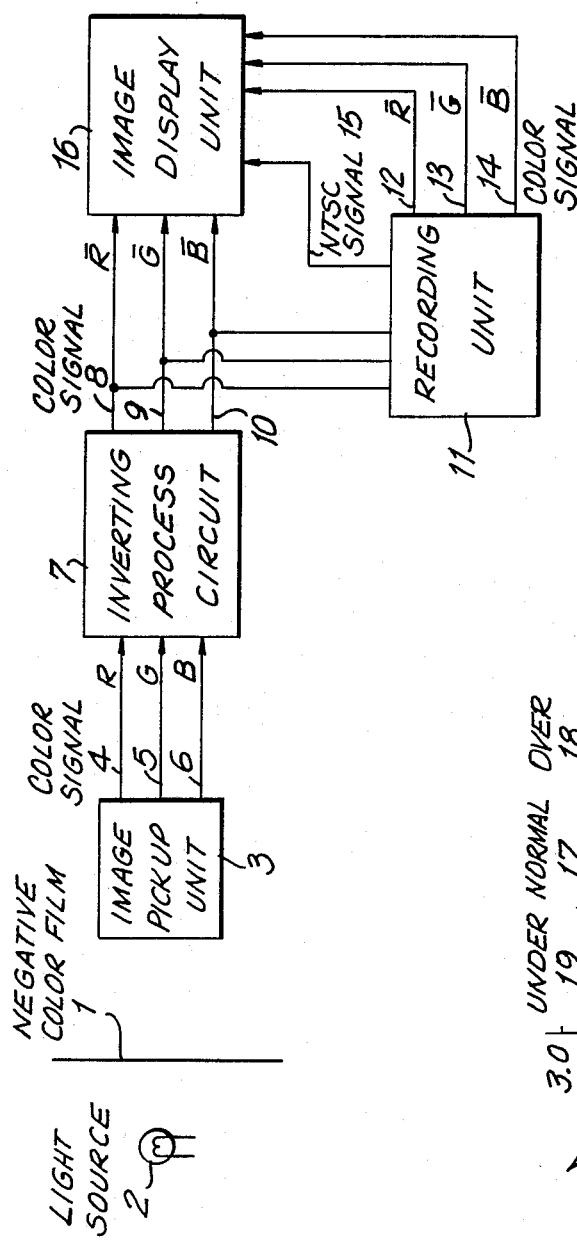
FIG. 3 is a block diagram of a basic prior art system for picking up and displaying the image.

Referring to FIG. 2, the inverting process circuit 20 has a gain control circuit 30, a color correction circuit 31, a black level correction circuit 32, and AGC circuit 33 for correcting white level, a negative/positive inverting circuit 34, a clamp circuit 35, a gamma correction circuit 36 preset with a plurality of gamma values, and a non-linear circuit 37. This inverting circuit 20 is the same as a normally used except that its gamma correction circuit 36 is preset with a plurality of gamma values.

The gamma correction circuit 36 is present with a plurality of gamma values by operator manipulation of the keyboard 24 to enter preset signals 24a. Also, the gamma correction circuit 36 is controlled to make gamma correction to one of the preset gamma values by means of a gamma value change signal 22a outputted by the calculation circuit 22, or by a gamma value change signal 25a manually outputted by the keyboard 25.

The characteristics value detection circuit 21 detects an average value D, a maximum value Dmax, and a minimum value Dmin in a single frame of image before gamma correction of the color signals and provides detection signals 21a, 21b, and 21c to the calculation circuit 22 representative of the exposure characteristics.

The calculation circuit 22 has memory storage and judgment functions. The gamma values in the gamma correction circuit 36 relative to combinations of the average values D and differences between the maximum and minimum values Dmax-Dmin are stored as tables in the calculation circuit 22. Also, combinations of the average values D and differences between the maximum and minimum values Dmax-Dmin are stored as tables in the calculation circuit 22. These relations are previously determined by experiments and the like. An example of the relations is shown in Table 1.

In table 1, N indicates a normal exposure, O indicates an over exposure, and U indicates an under exposure. The greater the suffix number of O or U, the stronger the tendency.

TABLE 1

| Average D | Difference Dmax − Dmin | Degree of exposure | Gamma value Yp of gamma correction circuit |
|---|---|---|---|
| | Small | 04 | 1.25 |
| Small | Medium | 03 | 1.15 |
| | Large | 02 | 1.05 |
| | Large | 01 | 0.65 |
| Medium | Medium | N | 0.70 |
| | Small | U1 | 0.75 |
| | Large | U2 | 1.40 |
| Large | Medium | U3 | 1.50 |
| | Small | U4 | 1.60 |

By means of the detection signals 21a, 21b, 21c inputted from the characteristics value detection circuit 21, the calculation circuit 22 determines the degree of exposure. It then outputs a gamma value change signal 22a to the gamma correction circuit of inverting circuit 20 to set the gamma value to the determined value, and outputs a signal 22b to the indicator 23 to cause it to display the determined degree of exposure.

As described above, upon operation of the characteristics value detection circuit 21 and the calculation circuit 22, the gamma correction circuit 36 automatically corrects the gamma value Yp of the gamma correction circuit 36 to a value matching the gamma value Yn of the negative film 1.

The keyboard 25 can be used for manually changing the gamma value. The operator can read the degree of exposure displayed on the indicator 23, and with reference to Table 1, can then operate the keyboard 25 to output a gamma value change signal 25a to set to the gamma correction circuit 36 at a corresponding value. Or, the operator can input the output of each inverting circuit 20 directly to a monitor 38 and while observing the displayed image, can adjust the gamma value by inputting a gamma value change signal 25a to the gamma correction circuit 36 until the desired contrast is obtained.

I claim:

1. In a system for reproducing a color image from a color film, of the type including a light source and a photoelectric pickup providing independent RGB signals representative of said color image for reproduction on a television screen by scanning the color film, the improvement comprising means for color contrast correction of the reproduced image to compensate for overexposure and underexposure of said color film, said means including:

a gamma correction circuit preset with a plurality of gamma values for each of said RGB signals;

a characteristic value detection circuit for providing an average value, a maximum value, and a minimum value of each of said RGB signals during the scanning of the color film;

display means for displaying the degree of exposure of the color film on the basis of the detected characteristic values; and means for selecting one of the plurality of preset gamma values of said gamma correction circuit for each of the RGB signals on the basis of the detected characteristic values such that the selected gamma values enable the color image to be reproduced on the television screen as if the color film has been normally exposed.

2. The system of claim 1, further including a memory for storing a table defining a relationship between ranges of values of said detected characteristic values, degrees of exposure of the color film, and said preset gamma values, and a circuit for comparing said detected characteristic values with said table to determine the degree of exposure of said color film and for providing a signal representative of the determined degree of exposure of said color film to said display means, and wherein said display means includes an indicator for displaying said signal provided by said circuit to display the determined degree of exposure of said color film.

3. The system of claim 1, including means for presetting the gamma values of said gamma correction circuit.

* * * * *